United States Patent [19]
Kobayashi et al.

[11] Patent Number: 4,883,448
[45] Date of Patent: Nov. 28, 1989

[54] BELT HAVING EMBEDDED WIRES INTERLACED ACROSS LENGTHWISE SURFACES OF SHAFTS

[75] Inventors: Toshimitsu Kobayashi, Tokai; Akio Inagaki, Okazaki; Yasuhiro Kobayashi; Masanori Mori, both of Chiryu; Takashi Sakakibara, Handa, all of Japan

[73] Assignee: Aisin Seiki Kabushiki Kaisha, Aichin, Japan

[21] Appl. No.: 216,520

[22] Filed: Jul. 8, 1988

[30] Foreign Application Priority Data

Jul. 10, 1987 [JP] Japan .............................. 62-173407
Jul. 10, 1987 [JP] Japan .............................. 62-173408

[51] Int. Cl.$^4$ .............................................. F16G 1/10
[52] U.S. Cl. .................................... 474/260; 474/267; 474/268
[58] Field of Search ........ 474/260, 263, 264, 266–268, 474/237; 156/137–144; 428/98, 113, 222, 311.5

[56] References Cited

U.S. PATENT DOCUMENTS

| | | |
|---|---|---|
| 66,111 | 6/1867 | White . |
| 421,246 | 2/1890 | Clouth .......................... 474/267 X |
| 1,573,559 | 2/1926 | Manley . |
| 2,672,168 | 3/1954 | Walters .......................... 474/267 X |
| 2,782,803 | 2/1957 | Rothermel et al. toh ............ 138/56 |
| 2,983,304 | 5/1961 | Rasero .......................... 474/268 X |
| 4,767,389 | 8/1988 | Habegger et al. ............... 474/268 X |

FOREIGN PATENT DOCUMENTS 613646275 12/1986 Japan .

Primary Examiner—Thuy M. Bui
Attorney, Agent, or Firm—Banner, Birch, McKie & Beckett

[57] ABSTRACT

A belt including a main body formed in to an endless configuration with a plurality of substantially equally pitched approximately round shafts embedded in the main body. Also included are a plurality of wires engaged along nearly an entire lengthwise portion of each of the shafts. The wires can be interlaced with the shafts or wound on the shafts and the wires cna be a twisted thread of organic fiber, inorganic fiber, or glass fiber. The main body can be made of rubber of high rigity having a longitudinal elastic coefficient of approximately 10–140 kg/mm$^2$. The main body could also be made of refractory synthetic resin having a longitudinal elastic coefficient of 5–150 kg/mm$^2$. Each shaft can be of substantially the same diameter along its entire length.

13 Claims, 3 Drawing Sheets

FIG. 8

TEST CONDITIONS AND RESULTS

| THE TESTED BELT | | RAW MATERIAL OF THE SHAFT | RAW MATERIAL OF THE WIRE | RAW MATERIAL OF THE MAIN BODY | DURABILITY OF THE BELT | EVALUATION |
|---|---|---|---|---|---|---|
| FIGS. 1 AND 2 | EXAMPLE 1 | ALUMINUM | POLYESTER FIBER | CHLOROPRENE RUBBER | 30 HOURS | GOOD |
| | EXAMPLE 2 | (SAME AS ABOVE) | AROMATIC POLYAMID FIBER | ← | 70 HOURS | GOOD |
| | EXAMPLE 3 | ← | ← | POLYESTER ELASTOMER | EXCEEDS 100 HOURS | GOOD |
| | EXAMPLE 4 | ← | ← | SILICONE | 50 HOURS | GOOD |
| | EXAMPLE 5 | ← | POLYAMID FIBER | POLYESTER ELASTOMER | 30 HOURS | GOOD |
| | EXAMPLE 6 | ← | CARBON FIBER | ← | 50 HOURS | GOOD |
| FIGS. 3 AND 4 | EXAMPLE 7 | CHLOROPRENE RUBBER (HIGH RIGID) | AROMATIC POLYAMID FIBER | CHLOROPRENE RUBBER | 70 HOURS | GOOD |
| | EXAMPLE 8 | ← | ← | ← | EXCEEDS 100 HOURS | GOOD |
| | EXAMPLE 9 | ← | ← | ← | EXCEEDS 100 HOURS | GOOD |
| CONVENTIONAL | | ← | ← | ← | 10 HOURS | BAD |

BELT HAVING EMBEDDED WIRES INTERLACED ACROSS LENGTHWISE SURFACES OF SHAFTS

BACKGROUND OF THE INVENTION

1. Field of the Invention

The present invention relates to a belt and in particular to a belt for transmitting motion from one wheel or pulley to another.

2. Description of the Prior Art

The conventional belt of this type is disclosed in Japanese Utility Model Publication No. 61-46275 which issued on Dec. 26, 1986. In detail, as shown in FIGS. 5 through 7, the belt 10 includes main body 11 made of synthetic resin and formed into an endless configuration. In the main body 11, there is embedded a core 12 so as to increase the strength of the main body 11. The core 12 has a plurality of equally pitched rectangular shafts 13, a first plurality of wires 14 and a second plurality of wires 15. The shaft 13 is provided at one end and the other end thereof with a first reduced portion 13a and a second portion 13b, respectively. The first plurality of wires 14 and the second plurality of wires 15 are interlaced with the first reduced portion 13a and a second reduced portion 13b, respectively. The plurality of wires 14 and 15 increase the tensile strength of the main body 11 and the plurality of shafts 13 prevent deformation of the main body 11.

However, the main body 11 and a portion of the shaft 13 with which wires 14 and/or wires 15 are subject to can separate due to shearing force applied to therebetween.

SUMMARY OF THE INVENTION

It is, therefore, a principal object of the present invention to provide a belt without the aforementioned drawback.

It is another object of the present invention to provide a belt in which a main body may not be separated from a plurality of shafts embedded therein.

According to the present invention, a belt comprises a main body which is formed into an endless loop configuration, a plurality of substantially equally pitched round shafts embedded in the main body and a plurality of wires embedded in the main body and substantially engaged along nearly an entire lengthwise portion of each of the plurality of shafts. In the present invention, as a whole, the strength of the belt against the shearing force is increased. This results in the elimination of the aforementioned drawback.

BRIEF DESCRIPTION OF THE DRAWINGS

FIG. 8 is a table presenting the test conditions and results with the belts of the present invention and a conventional belt.

DETAILED DESCRIPTION OF THE PREFERRED EMBODIMENTS

Figure 1:
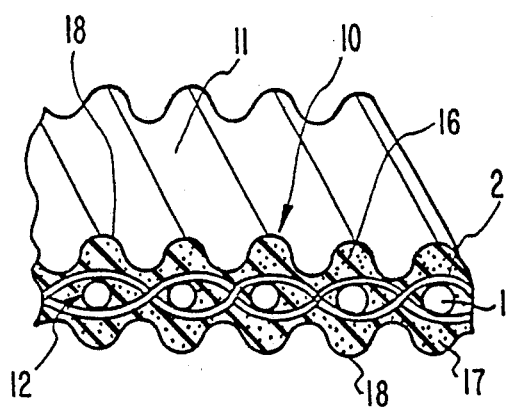
FIG. 1 is a perspective view of a belt according to a first embodiment of the present invention.
Figure 2:
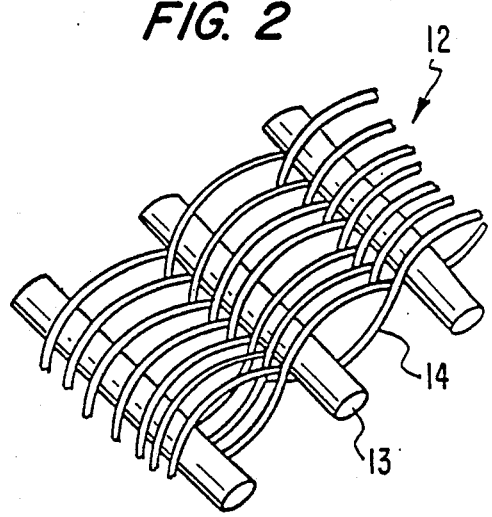
FIG. 2 is a perspective view showing a relationship between the plurality of wires and the plurality of shafts in the belt of FIG. 1.

Referring now to FIGS. 1 and 2, a belt 10 includes a main body 11 in which a core 12 is embedded. The main body 11 is provided at an outer surface and a lower surface thereof with a first plurality of cogs 16 and a second plurality of cogs 17, respectively. Each surface is covered with a sail-coth or a canvas-cloth 18. The main body 11 is made of rubber and is of high having a longitudinal elastic coefficient from 10 to 140 kg/mm$^2$. As such rubber, chloroprene-rubber is available. The main body 11 may be made of a refractory synthetic resin having longitudinal elastic coefficient from 15 to 150 kg/mm$^2$. As such synthetic resin, polyester-elastomer or silicone is available.

The core 12, embedded in the main body 11, includes a plurality of substantially equally spaced or pitched round shafts 13 and a plurality of wires 14 which are interlaced across substantially the entire lengthwise direction of the shafts 13.

Figure 3:
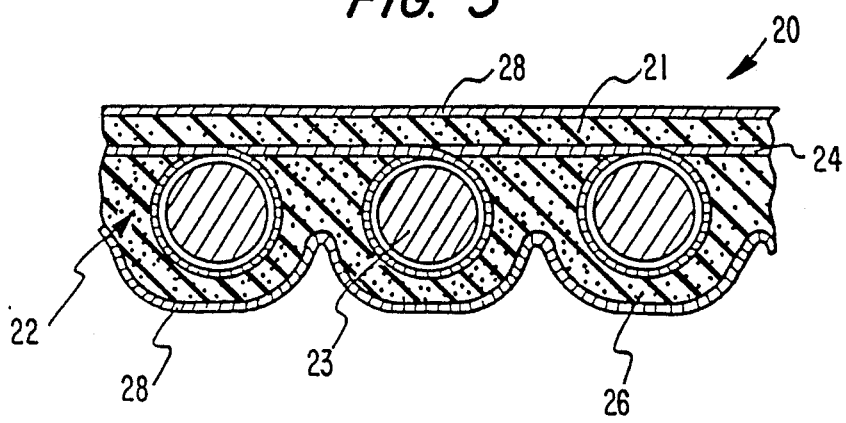
FIG. 3 is a cross-sectional view of a belt according to a second embodiment of the present invention.
Figure 4:
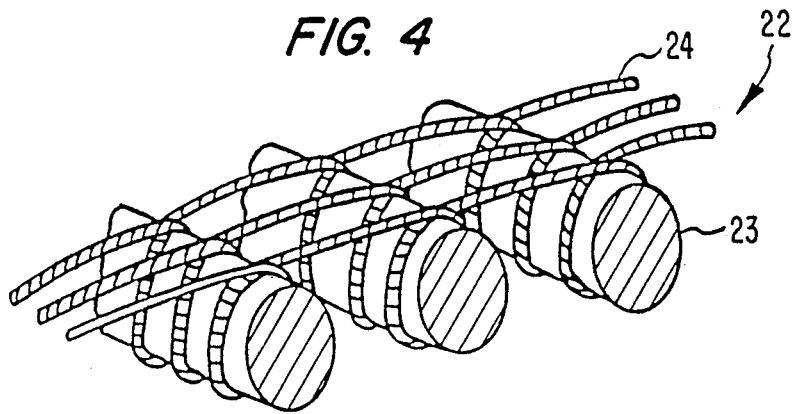
FIG. 4 is a perspective view showing a relationship between the plurality of wires and the plurality shafts in the belt of FIG. 3.
Figure 5:
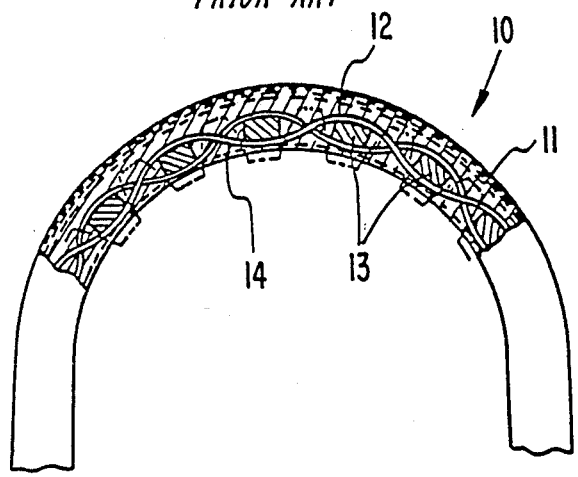
FIG. 5 is a cross-sectional view of a conventional belt.
Figure 6:
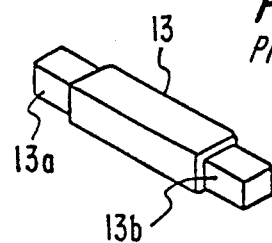
FIG. 6 is a perspective view showing a relationship between the plurality of wires and the plurality of shafts in the belt of FIG. 5.
Figure 7:
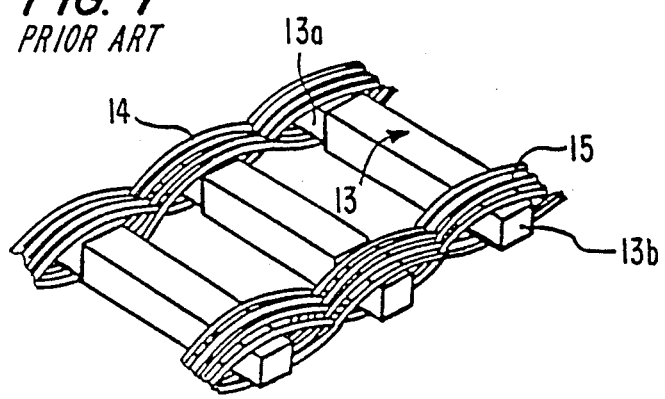
FIG. 7 is a perspective view of a single shaft in the belt of FIG. 5.

In FIGS. 3 and 4, there is shown another belt 20 having cogs 26 provided at only an inner surface. In a core 22 embedded in a main body 21, a plurality of wires 24 are wound on round shafts 23. Opposite surfaces of the belt 20 are covered with canvas-clothes 28.

The belt 10 and the belt 20 are tested so as to check the durability thereof under a condition wherein the temperature is 80–120 Centigrade, the rotational number of the pulley is 6000 rpm and the torque is 10 kg-cm. Other test-conditions and the results of these tests are shown in a table presented in FIG. 8. Durability of the belt 10 or 20 is represented by a required time-duration for the separation of the wires 14 or 24 from the main body 11 or 21.

What is claimed is:

1. A belt comprising:
    a main body including a first plurality of cogs defining an upper surface and a second plurality of cogs defining lower surface with said body formed into an endless configuration;
    a plurality of substantially equally pitched approximately round shafts with each shaft disposed between an upper surface cog and a corresponding lower surface cog; and
    a plurality of wires interlaced with said shafts in such a manner that each shaft is positioned at a portion at which two adjacent wires intersect.

2. A belt comprising:
    a main body having an upper surface with a first plurality of cogs and a lower surface with a second plurality of cogs and formed into an endless configuration;
    a plurality of equally pitched round shafts each of which is located between each upper cog and the corresponding lower cog thereto;
    a plurality of wires interlaced with the shafts in such a manner that each shaft is positioned at a portion at which two adjacent wires intersect; and
    sail-cloth means for covering the upper surface and the lower surface of the main body.

3. A belt according to claim 1, wherein said wires are wound on said shafts.

4. A belt according to claim 1, wherein each of said wires is a twisted thread.

5. A belt according to claim 4, wherein said thread is an organic fiber.

6. A belt according to claim 4, wherein said thread is an inorganic fiber.

7. A belt according to claim 4, wherein said thread is a glass fiber.

8. A belt according to claim 1, wherein said main body is made of rubber of high ridigity having a longitudinal elastic coefficient of approximately 10–140 kg/mm$^2$.

9. A belt according to claim 1, wherein said main body is made of refractory synthetic resin having a longitudinal elastic coefficient of approximately 5–150 kg/mm$^2$.

10. A belt comprising:
 a main body including a first plurality of cogs defining an upper surface and a second plurality of cogs defining a lower surface with said body formed into an endless configuration;
 a plurality of shafts with each shaft disposed between an upper surface cog and a corresponding lower surface cog; and
 a plurality of wires interlaced across a substantial portion of the lengthwise surface of each of said plurality of shafts, and defining a plurality of axes substantially parallel to said shafts along which adjacent wires intersect, with each of said shafts directly adjacent one of said axes where said wires intersect.

11. A belt as in claim 10, wherein each of said shafts are of substantially the same diameter along their entire length.

12. A belt as in claim 10, wherein said interlaced wires are also wound on each of said shafts.

13. A belt in claim 10, wherein said shafts are substantially round.

* * * * *

UNITED STATES PATENT AND TRADEMARK OFFICE
CERTIFICATE OF CORRECTION

PATENT NO. : 4,883,448

DATED : November 28, 1989

INVENTOR(S) : Toshimitsu KOBAYASHI; Akio INAGAKI; Yasuhiro KOBAYASHI; Masanori MORI; and Takashi SAKAKIBARA It is certified that error appears in the above-identified patent and that said Letters Patent is hereby corrected as shown below:

On the title page:

ASSIGNEE: "Aichin" to "Aichi-ken"; and

ABSTRACT: "in to" (first line) to "into".

Signed and Sealed this

Twelfth Day of February, 1991

Attest:

HARRY F. MANBECK, JR.

*Attesting Officer*     *Commissioner of Patents and Trademarks*